United States Patent Office 3,792,066
Patented Feb. 12, 1974

---

3,792,066
PROCESS FOR THE PREPARATION OF ACYLATED UNSATURATED LONG-CHAIN COMPOUNDS
Edward S. Rothman, North Hills, and Gordon G. Moore, Willow Grove, Pa., assignors to the United States of America as represented by the Secretary of Agriculture
No Drawing. Filed Apr. 29, 1971, Ser. No. 138,789
Int. Cl. C07c 69/66, 49/20
U.S. Cl. 260—405
6 Claims

ABSTRACT OF THE DISCLOSURE

Long chain acyl groups are attached to isolated double bonds in fatty acid molecules with retention of the unsaturation by acylating a fatty acid molecule with an acylated enol such as isopropenyl stearate in the presence of an electron deficient catalyst such as aluminum chloride, boron trifluoride or stannic chloride.

---

A non-exclusive, irrevocable, royalty-free license in the invention herein described. throughout the world for all purposes of the United States Government, with the power to grant sublicenses for such purposes, is hereby granted to the Government of the United States of America.

This invention relates to the preparation of branched chain compounds useful as non-crystallizable lubricants and plasticizers. More particularly, it relates to a process for attaching long chain acyl groups to isolated double bonds in fatty acid molecules with retention of the double bond.

An object of this invention is to provide novel branched chain compounds that are useful as non-crystallizable lubricants and plasticizers.

Another object of this invention is to attach long chain acyl groups to isolated double bonds in fatty acid molecules and still retain the unsaturation.

According to this invention long chain acyl groups are attached to double bonds in fatty acid molecules with retention of the unsaturation by acylating a long chain fatty acid or fatty acid ester with an acylated enol such as the stearoylated enolic form of acetone in the presence of an electron deficient catalyst such as aluminum chloride, boron trifluoride or stannic chloride. The process is exemplified by the stearoylation of methyl oleate as follows:

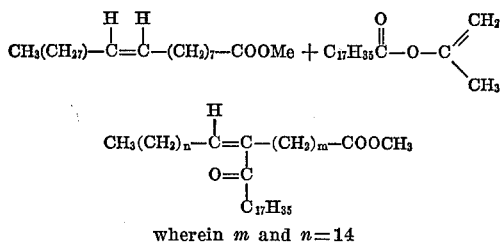

wherein $m$ and $n = 14$

As the reaction proceeds, the double bond of the cis methyl oleate not only isomerizes to the predominantly trans form but the double bond also migrates to the extent of forming complex positional isomer mixtures that resist crystallization even at low temperature thus enhancing the lubricating properties of the product.

Acylation of isolated double bonds by Friedel-Crafts reaction techniques using an ester as the acylating agent has not been reported. For example, no mention of such a reaction is found in the eight-volume treatise, "Friedel-Crafts and Related Reactions," edited by G. Olah, Interscience Publishers, New York (1964), and no mention is found in the chemical literature subsequent to the treatise. Acylation of the olefinic double bond may occur simultaneously with other reactions such as the acylation of hydroxy groups that occurs in the treatment of methyl ricinoleate and the complex polymerization reactions of diolefins or polyolefins that occurs with methyl linoleate. Other than these side reactions, the olefin acylation of this invention proceeds smoothly. Only in the case of methyl linoleate were appreciable amounts of other reaction products detected. In this case, a compound containing only a single oxygen atom but nevertheless exhibiting intense ultraviolet absorption at 273 millimicrons was found.

It is noted that the ketonic, unsaturated products described in this invention do not exist solely as alpha-beta unsaturated ketones in the stable form. Because of the requirements for resonance stabilization of coplanarity of the two multiple bonds which are opposed by thermal twistings of the connecting single bond, there is an equilibrium of the two forms. The infrared spectrum of the methyl stearoyloctadecene clearly shows both conjugated and nonconjugated ketone bands at 1710 and 1667 wave numbers. The 1710 band does not disappear on washing with alkali or with treatment with excess diazomethane and therefore does not represent stearic acid carbonyl bands.

The following examples of the olefin acylation reaction illustrate the scope of the invention.

EXAMPLE 1

Stearoylation of methyl oleate to form mixed methyl octadecanoyl-octadecenoates

Methyl oleate, 40 g., (0.0135 mole), and isopropenyl stearate 44.3 g., (0.0137 mole), were treated with 21.8 g. (0.1635 mole) of anhydrous aluminum chloride. The reaction gave off much heat and the mixture quickly liquified to a viscous brown syrup. The mixture was then heated at 105° C. for an additional half hour, cooled, diluted with 800 ml. of methylene chloride and washed well with 0.5 N hydrochloric acid. Emulsions that form may be eliminated by filtering off solid "fines" or, if the emulsion is the result of some ester saponification it may be necessary to remethylate.

The product, by infrared examination, shows the presence of about one part unreacted (apart from isomerization) methyl oleate, containing the trans isomer among others, and about one part of the required alpha-beta unsaturated ketone. The unreacted material may be removed by distillation in vacuo, or by chromatography in small batches on hydrated magnesium silicate. Undesired methyl oleate elutes quickly with hexane and the more tenaciously held methyl stearoyloleate elutes in 44% yield with methylene chloride and with diethyl ether. The ketone-ester absorbs in the ultraviolet at 228 m$\mu$ in isooctane and at 235 m$\mu$ in ethanol (log extinction coefficient 3.96). The ketone-ester absorbed in the infrared at 1735 (COOCH$_3$), 1667 (C=C—C=O) wave numbers and showed a characteristic doublet at 1172 and 1200 wave numbers. The product eluted slowly from a gas-liquid chromatography column (5% SE-30, programmed 210–320° C.) behaving in general like a diglyceride. Thermistor molecular weight determination gave evidence of a molecule containing on the order of thirty-six carbon atoms. Nuclear magnetic resonance bands showed the methoxy group at $\delta$ 3.60 and the olefinic protons as a complex triplet at $\delta$ 6.35, 6.47 and 6.78. Catalytic hydrogenation in hexane gave a liquid hydroxy ester mixture of isomers having prominent infrared bands at 3510 (OH), 1737 (C=O), 1250, 1200, 1170 and 722 wave numbers.

EXAMPLE 2

Octadecanoyl octadecene

A sample of mixed cis and trans 9-octadecene, 30.6 g., (0.1215 mole), and isopropenyl stearate 43.9 g., (0.1355 mole), were melted together, cooled (ice-bath) and 15 g.

(0.1127 mole) of anhydrous aluminum chloride were added. The reaction temperature rose to 70° C. even though the reaction flask was packed in ice. The flask contents were then heated to 120° C. for twenty minutes. The product was isolated by chromatography on commercial 100–200 mesh hydrated magnesium silicate activated by heating two days at 180° C. Unreacted olefin eluted first in pentane washings; the product was eluted with methylene chloride and with mixtures of methylene chloride and anhydrous ether. The product showed ultraviolet absorption at 228 m$\mu$ in 2,2,4-trimethylpentane, and showed infrared bands at 1710 (C=O), 1667 (C=C—C=O), 1262 (sharp), 1377 and 741 wave numbers.

EXAMPLE 3

Methyl stearoyllinoleate

Methyl linoleate 8.89 g., (0.0302 mole) isopropenyl stearate 9.84 g., (0.0030 mole), and aluminum chloride 4.85 g., (0.0362 mole), were reacted in a manner similar to the above examples. The product, a pale yellow oil, was eluted with diethyl ether.

EXAMPLE 4

Methyl stearoylricinoleate

Methyl ricinoleate 9.06 g., (0.03 mole), isopropenyl stearate 19.4 g., (0.06 mole), aluminum chloride 8 g., (0.06 mole), were reacted in a manner similar to the previous examples. Prior to chromatographic separation, however, it was necessary to remove 3 g. of crystalline stearic acid. The required product was an amber oil.

We claim:

1. A process for attaching a long chain acyl group to an isolated double bond in a compound selected from the group consisting of methyl oleate, methyl linoleate, methyl ricinoleate and mixed cis and trans 9-octadecene comprising acylating said compound with isopropenyl stearate in the presence of an electron deficient catalyst selected from the group consisting of anhydrous aluminum chloride, boron trifluoride and stannic chloride to obtain an unsaturated acylated compound that retains the structure of the starting compound except that a hydrogen atom attached to one of the double bond carbon atoms is replaced with a stearoyl group.

2. The process of claim 1 wherein the electron deficient catalyst is anhydrous aluminum chloride.

3. The process of claim 2 wherein the compound containing the isolated double bond is methyl oleate.

4. The process of claim 2 wherein the compound containing the isolated double bond is methyl linoleate.

5. The process of claim 2 wherein the compound containing the isolated double bond is methyl ricinoleate.

6. The process of claim 2 wherein the compound containing the isolated double bond is a mixed cis and trans 9-octadecene.

References Cited

UNITED STATES PATENTS 3,356,731   12/1967   Nilsson et al. _____ 260—586

OTHER REFERENCES

Rothman, J. Am. Oil Chemists Soc., vol. 45, 189–93, March 1968.

LEWIS GOTTS, Primary Examiner

D. G. RIVERS, Assistant Examiner

U.S. Cl. X.R.

260—410.9 R, 595, 32.2; 252—56 S